3,299,144
METHOD FOR THE PREPARATION OF
ALLYL DECABORANE
Robert J. F. Palchak, La Vale, Md., assignor to Olin Mathieson Chemical Corporation, a corporation of Virginia
No Drawing. Filed Jan. 30, 1959, Ser. No. 790,294
8 Claims. (Cl. 260—606.5)

This invention relates to the preparation of allyl decaborane ($CH_2CHCH_2B_{10}H_{13}$).

Allyl decaborane can be prepared by the direct reaction of an allyl halide, such as allyl chloride, allyl bromide, or allyl iodide, and a compound of the class $B_{10}H_{13}M$ wherein M is an alkali metal, such as lithium, sodium or potassium, for example, decaboranyl sodium $B_{10}H_{13}Na$. Thus, when the allyl halide is allyl bromide and $B_{10}H_{13}M$ is decaboranyl sodium, the reaction can be expressed by the following equation:

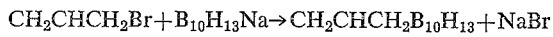

$$CH_2CHCH_2Br + B_{10}H_{13}Na \rightarrow CH_2CHCH_2B_{10}H_{13} + NaBr$$

The reaction between the allyl halide and $B_{10}H_{13}M$ wherein M has the previously given significance, is preferably conducted while the reactants are admixed with a solvent which is inert with respect to the reactants under the reaction conditions, for example, diethyl ether, diisopropyl ether, tetrahydrofuran, n-pentane and benzene, at a temperature within the range from 25° C. to 75° C., preferably at about the reflux temperature of the solvent employed, since allyl decaborane tends to dimerize. The relative amounts of reactants can be varied widely but generally are approximately equimolar. Methallyl decaborane can be prepared in a similar manner by the use of a methallyl halide in place of the allyl halide.

Allyl decaborane is a liquid at room temperature and is soluble in benzene, n-pentane, diethyl ether, di-n-propyl ether and tetrahydrofuran. Allyl decaborane can be used as a liquid high energy fuel in the manner disclosed in copending application Serial No. 497,407, filed March 28, 1955, of Elmar A. Altwicker et al.

The following examples illustrate in detail the method of this invention.

Example I

Allyl bromide (54.45 g., 0.45 mole) was added to a 300 ml. diethyl ether solution of decaboranyl sodium (prepared from 61.2 g., (0.5 mole) of decaborane and 22 g. (0.55 mole) of a 60.62 weight percent dispersion of sodium hydride in mineral oil). The mixture was stirred while refluxing for one hour, then maintained at room temperature for six days, after which it was filtered to remove sodium bromide. The filtrate was concentrated under reduced pressure to yield approximately 100 ml. of a mobile red-brown liquid. After 3½ weeks at −5° C., this concentrate was continuously extracted in a liquid-liquid extractor with n-pentane for 3 days. The pentane extract was filtered and the pentane was evaporated under reduced pressure to leave 15 grams of a pale yellow-green liquid. Mass spectro metric analysis identified the material as impure allyl decaborane. The infrared spectrum was characteristic of an alkylated decaborane but showed no double-bond absorption peaks. An 8 ml. sample of this extract was distilled under vacuum (approximately $5 \times 10^{-3}$ mm. Hg absolute) from a modified semi-micro, Claisen flask to yield decaborane, 2-3 ml. of a clear colorless liquid (pot temperature, 70–180° C.), and a nearly colorless residue. The mass spectrum of the clear liquid indicated that it was principally allyl decaborane with a small but significant amount of a component with a mass cut-off peak in the 240–250 region. The infrared spectrum showed an alkylated decaborane with an absorption band in the 6.15 micron double-bond region.

The residue in the extraction flask was extracted with fresh pentane for 3 days producing a heavy viscous pentane-immiscible orange liquid. A mass spectrographic analysis indicated that the product contained decaborane, allyl decaborane and a borane with a 219 mass number, an unknown compound.

The residual product in the extractor was extracted with ether for 3 days. Removal of the ether under high vacuum produced an extremely viscous, tacky, clear orange product whose vapor pressure was too low to yield a mass spectrum.

Example II

Decaborane (6.2 g., 0.05 mole) was added to a suspension of 4.94 grams (0.09 mole) of sodium methoxide in 30 ml. of n-propyl ether. An additional 20 ml. of propyl ether was added and the mixture was stirred and refluxed for eight hours. It was then filtered, diluted with about 50 ml. of ethyl ether and refiltered. The yellow filtrate was concentrated by vacuum distillation (water aspirator) to about 15–20 ml. of a yellow slurry of decaboranyl sodium. Allyl chloride (7 g., 0.10 mole) was added and the mixture was heated under reflux conditions for one hour, during which time the color changed from orange to brown, and a fine, tan precipitate formed. Ethyl ether was added, producing additional precipitate and the resultant mixture was filtered. The filtrate was concentrated on a steam bath, and the residue was rapidly distilled under vacuum (approximately $10^{-2}$ mm. Hg absolute) to yield traces of a distillate comprised of fine crystals of decaborane and a liquid. Most of the decaborane was separated from the distillate by vacuum sublimation. The residual distillate, which was just sufficient for mass spectro metric analysis, yielded a spectral pattern indicative of allyl decaborane.

This experiment was repeated several times with minor variations and allyl decaborane was identified in each instance with the mass spectrometer.

Example III

Decaboranyl sodium was prepared by the addition of 2.25 grams of 91% pure sodium hydride to a solution of 10.43 grams of decaborane in 100 ml. of tetrahydrofuran. The product was isolated by precipitation with 20 ml. of n-pentane and then dried in vacuo for three and one-half hours at 85 to 90° C. The material, whose analysis corresponded to that of a ditetrahydrofuranate of decaboranyl sodium, was used as such.

The decaboranyl sodium (1 gram) was placed on a glass frit of medium porosity. Allyl bromide (15 cc.) was heated to 60° C. and mixed with the solid on the frit. Liquid not passing through the frit in 15 minutes was removed under vacuum. This procedure was repeated twice. The unreacted allyl bromide was removed under reduced pressure and the residue was analyzed via the mass spectrometer. Indication of the presence of allyldecaborane prompted an attempt to isolate this product via distillation. The use of a Hickman still resulted only in the formation of a viscous liquid in the still flask and no distillation occurred. The viscous liquid was not analyzed.

Example IV

Allyl chloride (42.10 g., 0.55 mole) was added to a diethyl ether slurry of decaboranyl sodium (prepared from 61.2 g., 0.5 mole, of decaborane and 22 g. (0.55 mole) of a 60.62 weight percent dispersion of sodium hydride in mineral oil) and the mixture was stirred at an oil bath temperature of 55° C. in a nitrogen atmosphere for 44 hours. The mixture was then filtered and the yellow filtrate was concentrated by warming at about 40° C. at a reduced pressure of 15–20 mm. Hg absolute. The product was accidently overheated to about 100° C. while being concentrated and it began to froth. It was quickly transferred to the centrifugal molecular still and held under vacuum for 48 hours. During this time the yellow material had become too viscous for the apparatus to function properly. It was therefore distilled from an all glass pot-type molecular still to yield about 1 ml. of a pale yellow liquid. Mass spectrometric analysis showed that the distillate contained allyl decaborane, decaborane and an unknown with a mass number of 214.

The liquid compositions of this invention can be used as fuels when burned with air. Thus, they can be used as fuels in basic and auxiliary combustion systems in gas turbines, particularly aircraft gas turbines of the turbojet or turboprop type. Each of those types is a device in which air is compressed and fuel is then burned in a combustor in admixture with the air. Following this, the products of combustion are expanded through a gas turbine. The liquid products of this invention are particularly suited for use as a fuel in the combustors of aircraft gas turbines of the types described in view of their improved energy content, combustion efficiency, combustion stability, flame propagation, operational limits and heat release rates over fuels normally used for these applications.

The combustor pressure in a conventional aircraft gas turbine varies from a maximum at static sea level conditions to a minimum at the absolute ceiling of the aircraft, which may be 65,000 feet or 70,000 feet or higher. The compression ratios of the current and near-future aircraft gas turbines are generally within the range from 5:1 to 15: or 20:1, the compression ratio being the absolute pressure of the air after having been compressed (by the compressor in the case of the turbojet or turboprop engine) divided by the absolute pressure of the air before compression. Therefore, the operating combustion pressure in the combustor can vary from approximately 90 to 300 pounds per square inch absolute at static sea level conditions to about 5 to 15 pounds per square inch absolute at the extremely high altitudes of approximately 70,000 feet. The liquid products of this invention are well adapted for efficient and stable burning in combustors operating under these widely varying conditions.

In normal aircraft gas turbine practice it is customary to burn the fuel, under normal operating conditions, at overall fuel-air ratios by weight of approximately 0.012 to 0.020 across a combustion system when the fuel employed is a simple hydrocarbon, rather than a borohydrocarbon of the present invention. Excess air is introduced into the combustor for dilution purposes so that the resultant gas temperature at the turbine wheel in the case of the turbojet or turboprop engine is maintained at the tolerable limit. In the zone of the combustor where the fuel is injected the local fuel-air ratio is approximately stoichiometric. This stoichiometric fuel to air ratio exists only momentarily, since additional air is introduced along the combustor and results in the overall ratio of approximately 0.012 to 0.020 for hydrocarbons before entrance into the turbine section. For the higher energy fuels of the present invention, the local fuel to air ratio in the zone of fuel injection should also be approximately stoichiometric, assuming that the boron, carbon and hydrogen present in the products burn to boric oxide, carbon dioxide and water vapor. In the case of the higher energy fuels of the present invention, because of their higher heating values in comparison with the simple hydrocarbons, the overall fuel-air ratio by weight across the combustor will be approximately 0.008 to 0.016 if the resultant gas temperature is to remain within the presently established tolerable temperature limits. Thus, when used as the fuel supplied to the combustor of an aircraft gas turbine engine, the liquid products of the present invention are employed in essentially the same manner as the simple hydrocarbon fuel presently being used. The fuel is injected into the combustor in such a manner that there is established a local zone where the relative amounts of fuel and air are approximately stoichiometric so that combustion of the fuel can be reliably initiated by means of an electrical spark or some similar means. After this has been done, additional air is introduced into the combustor in order to cool sufficiently the products of combustion before they enter the turbine so that they do not damage the turbine. Present-day turbine blade materials limit the turbine inlet temperature to approximately 1600° to 1650° F. Operation at these peak temperatures is limited to periods of approximately five minutes at take-off and climb and approximately 15 minutes at combat conditions in the case of military aircraft. By not permitting operation at higher temperatures and by limiting the time of operation at peak temperatures, satisfactory engine life is assured. Under normal cruising conditions for the aircraft, the combustion products are sufficiently diluted with air so that a temperature of approximately 1400° F. is maintained at the turbine inlet.

The liquid products of this invention can also be employed as aircraft gas turbine fuels in admixture with the hydrocarbons presently being used, such as JP–4. When such mixtures are used, the fuel-air ratio in the zone of the combustor where combustion is initiated and the overall fuel-air ratio across the combustor will be proportional to the relative amounts of borohydrocarbon of the present invention and hydrocarbon fuel present in the mixture, and consistent with the air dilution required to maintain the gas temperatures of these mixtures within accepted turbine operating temperatures.

Because of their high chemical reactivity and heating values, the liquid products of this invention can be employed as fuels in ramjet engines and in afterburning and other auxiliary burning schemes for the turbojet and bypass or ducted type engines. The operating conditions of afterburning or auxiliary burning schemes are usually more critical at high altitudes than those of the main gas turbine combustion system because of the reduced pressure of the combustion gases. In all cases the pressure is only slightly in excess of ambient pressure and efficient and stable combustion under such conditions is normally difficult with simple hydrocarbons. Extinction of the combustion process in the afterburner may also occur under these conditions of extreme altitude operations with conventional aircraft fuels.

The burning characteristics of the liquid products of this invention are such that good combustion performance can be attained even at the marginal operating conditions encountered at high altitudes, insuring efficient and stable combustion and improvement in the zone of operation before lean and rich extinction of the combustion process is encountered. Significant improvements in the non-afterburning performance of a gas turbine-afterburner combination is also possible because the high chemical reactivity of the products of this invention eliminates the need of flame-holding devices within the combustion zone of the afterburner. When employed in an afterburner, the fuels of this invention are simply substituted for the hydrocarbon fuels which have been heretofore used and no changes in the manner of operating the afterburner need be made.

The ramjet is also subject to marginal operating conditions which are similar to those encountered by the afterburner. These usually occur at reduced flight speeds and extremely high altitudes. The liquid products of this invention will improve the combustion process of the ramjet in much the same manner as that described for the afterburner because of their improved chemical reactivity over that of simple hydrocarbon fuels. When employed in a ramjet, the liquid fuels of this invention will be simply substituted for hydrocarbon fuels and used in the established manner.

I claim:
1. A method for the preparation of allyl decaborane which comprises reacting an allyl halide and a compound of the class $B_{10}H_{13}M$, wherein M is an alkali metal, at a temperature within the range from 25° C. to 75° C.

2. The method of claim 1 wherein the reactants are in admixture with a solvent which is inert under the reaction conditions.

3. A method for the preparation of allyl decaborane which comprises reacting an allyl halide and decaboranyl sodium at a temperature within the range from 25° C. to 75° C.

4. The method of claim 3 wherein the allyl halide is allyl bromide.

5. The method of claim 3 wherein the allyl halide is allyl chloride.

6. The method of claim 4 wherein the reactants are in admixture with diethyl ether.

7. The method of claim 5 wherein the reactants are in admixture with diethyl ether.

8. Allyl decaborane.

No references cited.

HELEN M. McCARTHY, *Acting Primary Examiner.*

LEON D. ROSDOL, ROGER L. CAMPBELL,
*Examiners.*

L. A. SEBASTIAN, W. F. W. BELLAMY,
*Assistant Examiners.*